US012732580B2

(12) United States Patent
Ikeda

(10) Patent No.: US 12,732,580 B2
(45) Date of Patent: Sep. 8, 2026

(54) IMAGE READING APPARATUS AND IMAGE FORMING APPARATUS HAVING INCLINED PLANAR SHAPE OF BACKGROUND MEMBER TO IMPROVE SHEET SHADOW DETECTION ACCURACY

(71) Applicant: CANON KABUSHIKI KAISHA, Tokyo (JP)

(72) Inventor: Masahito Ikeda, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 194 days.

(21) Appl. No.: 18/418,489

(22) Filed: Jan. 22, 2024

(65) Prior Publication Data

US 2024/0267474 A1 Aug. 8, 2024

(30) Foreign Application Priority Data

Feb. 6, 2023 (JP) ................................ 2023-016050

(51) Int. Cl.

| | |
|---|---|
| ***H04N 1/04*** | (2006.01) |
| ***H04N 1/028*** | (2006.01) |
| ***H04N 1/053*** | (2006.01) |
| ***H04N 1/10*** | (2006.01) |
| ***H04N 1/12*** | (2006.01) |

(52) U.S. Cl.
CPC ......... *H04N 1/02895* (2013.01); *H04N 1/053* (2013.01); *H04N 1/1061* (2013.01); *H04N 1/1215* (2013.01)

(58) Field of Classification Search
USPC .......................... 358/1.5, 488, 496, 498, 475
See application file for complete search history.

(56) References Cited

U.S. PATENT DOCUMENTS 5,764,382 A * 6/1998 Shiraishi ............. H04N 1/1215 355/407
8,867,107 B1 * 10/2014 Shimizu ............ H04N 1/00753 358/475

(Continued)

FOREIGN PATENT DOCUMENTS

JP 2002190927 A 7/2002
JP 2003300645 A 10/2003

(Continued)

*Primary Examiner* — Cheukfan Lee
(74) *Attorney, Agent, or Firm* — ROSSI, KIMMS & McDOWELL LLP

(57) ABSTRACT

An image reading apparatus includes a conveyance member, a transparent member, a background member, and a reading unit. The reading unit arranged on an opposite side to the background member with respect to the transparent member. The reading unit includes a light source and a reading sensor. The light source emits light toward a sheet. The reading sensor reads a shadow of a sheet and an image of the sheet through the transparent member. The shadow of the sheet is projected onto the background member. As viewed in a width direction perpendicular to a conveyance direction, an irradiating direction of the light inclines downstream in the conveyance direction toward a downstream side in the irradiating direction. The background member has a planar shape that is inclined to approach the transparent member from an upstream side toward a downstream side in the conveyance direction.

21 Claims, 10 Drawing Sheets

(56) References Cited

U.S. PATENT DOCUMENTS

| | | | | |
|---|---|---|---|---|
| 2003/0053155 | A1* | 3/2003 | Feng | H04N 1/10 358/505 |
| 2005/0141055 | A1* | 6/2005 | Sheng | H04N 1/00602 358/498 |
| 2007/0285741 | A1* | 12/2007 | Sato | H04N 1/00496 358/496 |
| 2010/0208306 | A1* | 8/2010 | Fukutome | H04N 1/00002 358/412 |
| 2010/0245951 | A1* | 9/2010 | Takeuchi | H04N 1/1225 358/498 |
| 2011/0176186 | A1* | 7/2011 | Kanaya | H04N 1/3878 358/474 |
| 2011/0194160 | A1* | 8/2011 | Maki | H04N 1/00702 358/488 |
| 2013/0182296 | A1* | 7/2013 | Masaki | H04N 1/00278 358/488 |
| 2014/0132966 | A1* | 5/2014 | Masaki | H04N 1/00785 358/1.5 |
| 2015/0002913 | A1* | 1/2015 | Takahashi | H04N 1/125 358/475 |
| 2016/0295061 | A1* | 10/2016 | Nishida | H04N 1/02885 |
| 2017/0171428 | A1* | 6/2017 | Kawano | H04N 1/3878 |
| 2018/0205843 | A1* | 7/2018 | Kim | H04N 1/00708 |
| 2018/0359385 | A1* | 12/2018 | Sheng | H04N 1/1225 |
| 2024/0267474 | A1* | 8/2024 | Ikeda | H04N 1/02895 |
| 2024/0267475 | A1* | 8/2024 | Nakamura | H04N 1/053 |
| 2026/0089285 | A1* | 3/2026 | Yoshida | H04N 1/40056 |

FOREIGN PATENT DOCUMENTS

| | | | |
|---|---|---|---|
| JP | 2018007080 | A | 1/2018 |
| JP | 2018157417 | A | 10/2018 |

* cited by examiner

IMAGE READING APPARATUS AND IMAGE FORMING APPARATUS HAVING INCLINED PLANAR SHAPE OF BACKGROUND MEMBER TO IMPROVE SHEET SHADOW DETECTION ACCURACY

BACKGROUND OF THE INVENTION

Field of the Invention

This disclosure relates to an image reading apparatus reading an image of such as a sheet-shaped document, and an image forming apparatus to which this image reading apparatus is applied.

Description of the Related Art

Hitherto, image forming apparatuses such as copiers and facsimiles are known to include image reading apparatuses that optically read an image of a document (sheet). This type of the image reading apparatuses includes automatic document conveyance apparatuses conveying the document one sheet at a time, and scanner units for reading the image of the document that is conveyed. In the image reading apparatuses described above, for a purpose of correcting image data that have been read, there is a known process of detecting a shadow of the document formed on a background member (refer to Japanese Patent Laid-Open No. 2018-157417). However, in conventional image reading apparatuses, the shadow of the document formed on the background member may be faint, and there is a possibility that the detection accuracy of the shadow may be reduced.

The purpose of this disclosure is to provide an image reading apparatus and an image forming apparatus that can improve the detection accuracy of the shadow of the sheet.

SUMMARY OF THE INVENTION

According to a first aspect of the present invention, an image reading apparatus includes a conveyance member configured to convey a sheet, a transparent member, a background member arranged in a manner of facing the transparent member, and a reading unit arranged on an opposite side to the background member with respect to the transparent member, the reading unit including a light source and a reading sensor, the light source being configured to emit light toward a sheet, the reading sensor being configured to read a shadow, projected onto the background member, of a sheet and an image of the sheet through the transparent member. As viewed in a width direction perpendicular to a conveyance direction of a sheet, an irradiating direction of the light of the light source inclines downstream in the conveyance direction toward a downstream side in the irradiating direction. The background member has a planar shape that is inclined to approach the transparent member from an upstream side toward a downstream side in the conveyance direction.

According to a second aspect of the present invention, an image forming apparatus includes a conveyance member configured to convey a sheet, a transparent member, a background member arranged in a manner of facing the transparent member, a reading unit arranged on an opposite side to the background member with respect to the transparent member, the reading unit including a light source and a reading sensor, the light source being configured to emit light toward a sheet, the reading sensor being configured to read a shadow, projected onto the background member, of a sheet and an image of the sheet through the transparent member, and an image forming unit configured to form an image on a sheet based on image information read by the reading unit. As viewed in a width direction perpendicular to a conveyance direction of a sheet, an irradiating direction of the light of the light source inclines downstream in the conveyance direction toward a downstream side in the irradiating direction. The background member has a planar shape that is inclined to approach the transparent member from an upstream side toward a downstream side in the conveyance direction.

Further features of the present invention will become apparent from the following description of exemplary embodiments with reference to the attached drawings.

DESCRIPTION OF THE EMBODIMENTS

Hereinafter, with reference to drawings, an exemplary embodiment for implementing this disclosure will be described.

Figure 1:
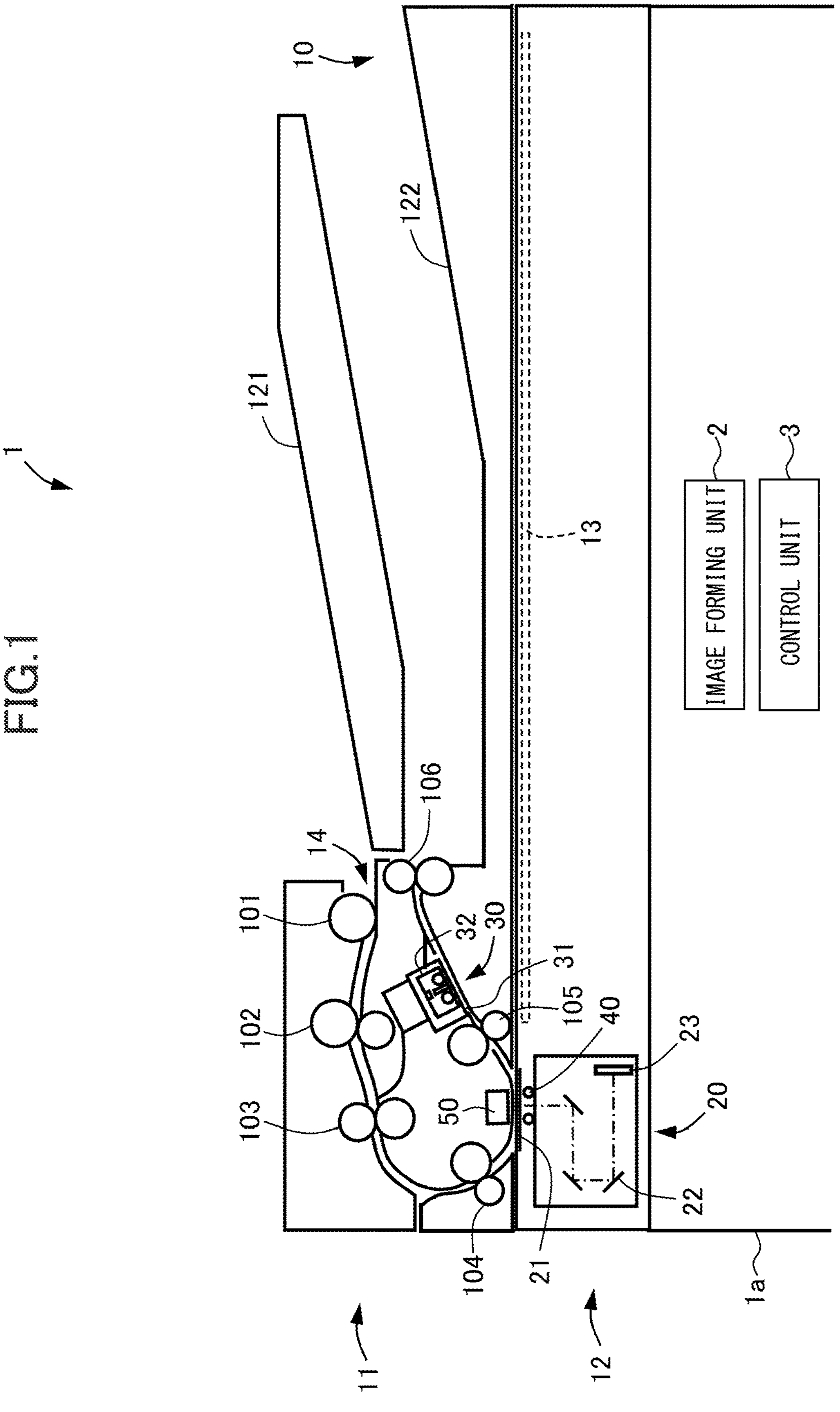
FIG. 1 is a cross-sectional view illustrating an image forming apparatus of an embodiment.

FIG. 1 is a schematic diagram illustrating an image forming apparatus 1 including an automatic document reading apparatus 10 that is an image reading apparatus according to the embodiment of this disclosure. The image forming apparatus 1 includes an image forming unit 2 that forms an image on a sheet based on image information read by the automatic document reading apparatus 10, and a control unit 3.

As for the image forming unit 2, it is acceptable to use, for example, an electrophotographic system that transfers a toner image formed on a photosensitive member onto the sheet S via an intermediate transfer member, or an electrophotographic mechanism that directly transfers the toner image formed on the photosensitive member onto the sheet S without involving the intermediate transfer member. Further, it is not limited to the electrophotographic system, and it is acceptable to use a printing unit of an ink jet system or an offset printing mechanism as the image forming unit 2.

The control unit 3 includes a central processing unit (CPU), a random access memory (RAM), and a read only memory (ROM), and controls each unit within the image forming apparatus 1. Based on a detected signal input from each sensor and information stored in the ROM, the CPU outputs an output signal to each electrical component at a desired timing and with a required control amount so as to operate the electrical components. Therefore, the CPU actually controls the electrical components. The ROM and RAM store information data required for the control of each unit. The CPU reads the data stored in the ROM, and writes into the RAM. To be noted, it is configured such that the control unit 3 also controls the automatic document reading apparatus 10.

Automatic Document Reading Apparatus

A configuration of the automatic document reading apparatus 10 of the present embodiment will be described using FIG. 1. FIG. 1 is a schematic diagram illustrating a cross-sectional configuration of the automatic document reading apparatus 10 of the present embodiment.

The automatic document reading apparatus 10 includes an automatic document feeder (ADF) 11 that conveys the document, and a reader 12 that reads image information from a mobile document conveyed by the ADF 11 and a stationary document placed on a platen glass 13. The ADF 11 is connected with respect to the reader 12 secured to an upper part of an apparatus body 1*a* of the image forming apparatus 1 in an openable and closable manner via an opening and closing hinge disposed on a back side of a top surface of the reader 12.

The reader 12 includes the platen glass 13, a reading unit 20 for a front surface, and a reading movement guide, not shown. While moving the reading unit 20 along the reading movement guide by a motor, not shown, the reader 12 performs a fixed reading operation by scanning a surface of the document placed on the platen glass 13 via the platen glass 13 that is a transparent member. In this case, the reading unit 20 acquires line images in a main scanning direction (alignment direction of a charge coupled device (CCD) 23) one line at a time, and, by integrating the line images with respect to a moving direction of the reading unit 20, which is a sub-scanning direction, image data of the whole surface of the document are acquired.

Further, in the reader 12, a reading glass 21, that is a transparent member different from the platen glass 13 is disposed. In a case where the automatic document reading apparatus 10 performs a document feeding reading operation of reading the image data while conveying the document one sheet at a time by the ADF 11, the reading unit 20 reads the image data on a surface (first surface) of the document by scanning the surface via the reading glass 21. The reading glass 21 is the transparent member according to the present embodiment, which forms a part of the conveyance path. Also in this case, the reading unit 20 acquires the line images in the main scanning direction one line at a time, and, by integrating the line images with respect to the conveyance direction DF of the document D, which is the sub-scanning direction, the image data of the whole surface of the document are acquired.

The reading unit 20 is an integrated scanning optical unit of a charge coupled device (CCD) method. The reading unit 20 includes an illumination unit 40, a plurality of mirrors 22, and a CCD 23. The reading unit 20 captures the scattered reflected light of the light that is illuminated onto the sheet-shaped document D, and obtains the image by reading the image formed by the CCD 23 via the plurality of mirrors 22. The illumination unit 40 is secured to a top of a box frame of the reading unit 20. The illumination unit 40 includes a first illumination portion 41 and a second illumination portion 42 (refer to FIG. 2). The CCD 23 is a reading sensor according to the present embodiment, which reads a shadow SH projected onto a white color sheet 51, described below, as the reflected light via the reading glass 21.

The ADF 11 includes a document tray 121, a pickup roller 101, a separation roller pair 102, a drawing roller pair 103, a read upstream roller pair 104, a read intermediate roller pair 105, a document discharge roller pair 106, and a document discharge tray 122. The document tray 121 is a loading portion capable of loading a plurality of sheets of the document D that is an object for reading. By coming into contact with an upper surface of a bundle of the document loaded on the tray 121, the pickup roller 101 sends out an uppermost document toward the separation roller pair 102. The separation roller pair 102 includes a conveyance roller and a separation roller forming a separation nip, and conveys the document sent by the pickup roller 101, while separating the document into one sheet at a time. The separation roller separating the document D is, for example, connected to a frame body of the ADF 11 via a torque limiter, and separates the document D by applying a friction force to the document D in the separation nip.

The drawing roller pair 103, the read upstream roller pair 104, the read intermediate roller pair 105, and the document discharge roller pair 106 are arranged along a U-shaped conveyance path that curves from the document tray 121 toward the document discharge tray 122 arranged below the document tray 121. These roller pairs form a conveyance member 14 that conveys the document D along the conveyance path via a reading position. The drawing roller pair 103 nips and conveys the document passed through the separation nip toward the read upstream roller pair 104. The read upstream roller pair 104 conveys the document D via a position in which the reading unit 20 scans the surface of the document D through the reading glass 21. The reading unit 20 and the reading glass 21 are located between the read upstream roller pair 104 and the read intermediate roller pair 105 in the conveyance path within the ADF 11 with respect to a conveyance direction DF of the document D. Further, a platen guide 50 is disposed in a manner facing the reading glass 21. The platen guide 50 will be described below.

Here, the ADF 11 of the present embodiment includes a reading unit 30 for a back surface, which reads the image data from a back surface (second surface) of the document D, and a reading glass 31, which is a transparent member, for the back surface. The reading unit 30 incorporates a contact image sensor (CIS) 32. The reading unit 30 and the reading glass 31 are arranged between the read intermediate roller pair 105 and the document discharge roller pair 106 in the conveyance path within the ADF 11 with respect to the conveyance direction DF. During the document feeding reading operation, the document D is conveyed via a position in which the reading unit 30 scans the back surface of the document D through the reading glass 31. The reading glass 31 is the transparent member according to the present embodiment, which forms a part of the conveyance path. In this case, the reading unit 30 acquires the line images in the main scanning direction one line at a time, and, by integrating the line images with respect to the conveyance direction DF of the document D, which is the sub-scanning direction, the image data of the whole back surface of the document D are acquired. That is, the reading unit 30 scans the back surface of the document D in the back surface reading position, and can read the image data of the back surface in parallel with the reading of the front surface by the reading unit 20.

The document D passed through the back surface reading position is discharged to the document discharge tray 122 by the document discharge roller pair 106. In a case where the plurality of sheets of the document D are loaded on the document tray 121, a sequence of operations including the feeding, separation, conveyance, reading of the image data from the front surface and/or the back surface, and discharging of the document D is repeated until the document feeding reading operation of the final document is completed.

Platen Guide

Figure 2:
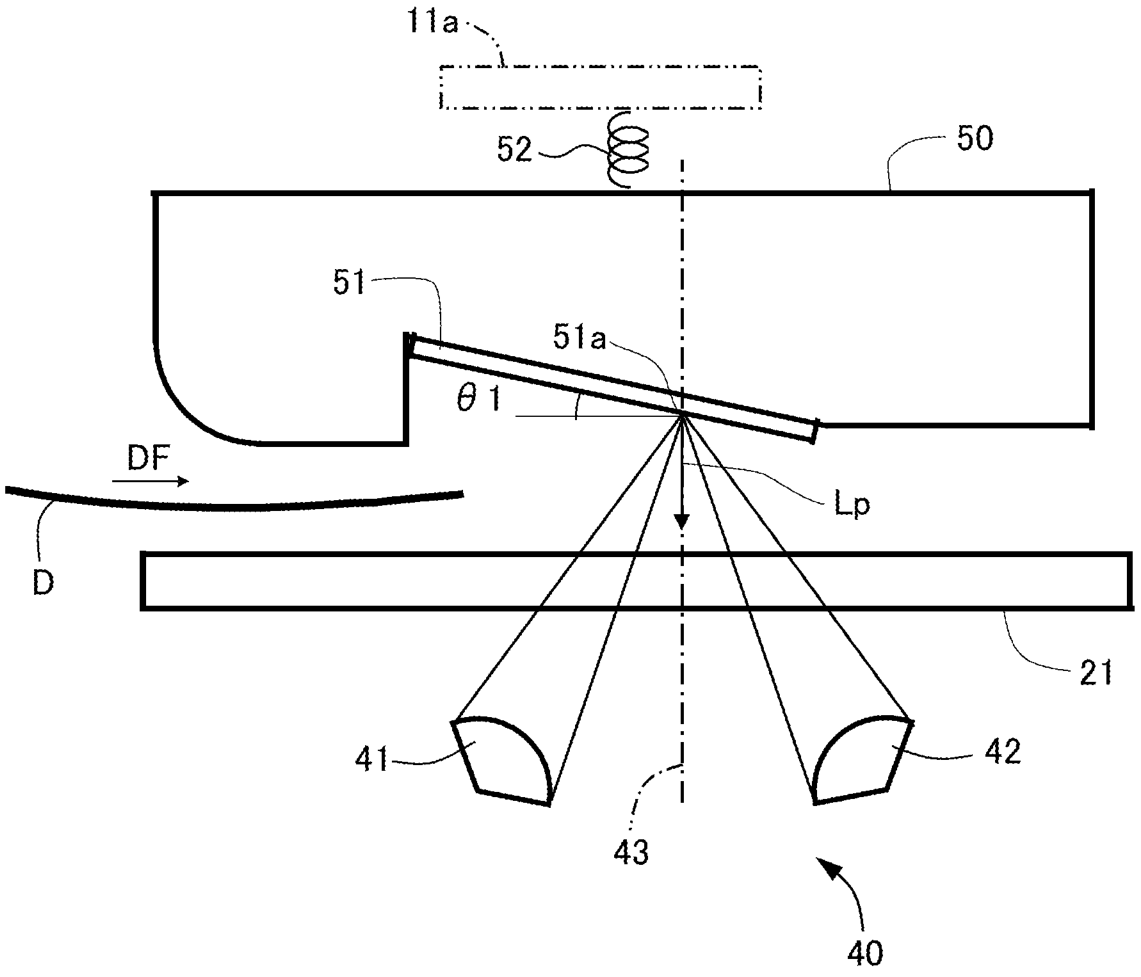
FIG. 2 is a cross-sectional view illustrating a major part of an automatic document reading apparatus of the embodiment.

Next, a configuration of and around the platen guide 50 disposed in a manner facing the reading glass 21 will be described. FIG. 2 is a cross-sectional view in which the vicinity of the reading unit 20 and the platen guide 50 in FIG. 1 is cut through by a plane perpendicular to both the main scanning and sub-scanning directions at an main scanning position. The platen guide 50 is a facing member according to the present embodiment, which is arranged to face the reading glass 21 and forms the conveyance path of the document D with the reading glass 21. While maintaining a predetermined interval to the reading glass 21, the platen guide 50 is urged toward the reading glass 21 by a spring member 52 that is a second urging member according to the present embodiment. The spring member 52 is connected to a frame 11*a* of the ADF 11. That is, the platen guide 50 is urged toward the reading glass 21 by the spring member 52, and, by abutting against the reading glass 21 via an abutting member, not shown, in an area outside of the conveyance path of the document D, maintains the interval to the reading glass 21 inside of the conveyance path of the document D. The spring member 52 abuts the platen guide 50 against the sheet conveyed by the conveyance member 14 by urging the platen guide 50 toward the reading glass 21. While, for example, a compression coil spring is applied as the spring member 52, it is not limited to this, and it is acceptable to apply an elastic member such as a spring of other shapes, rubber, and sponge.

Figure 3:
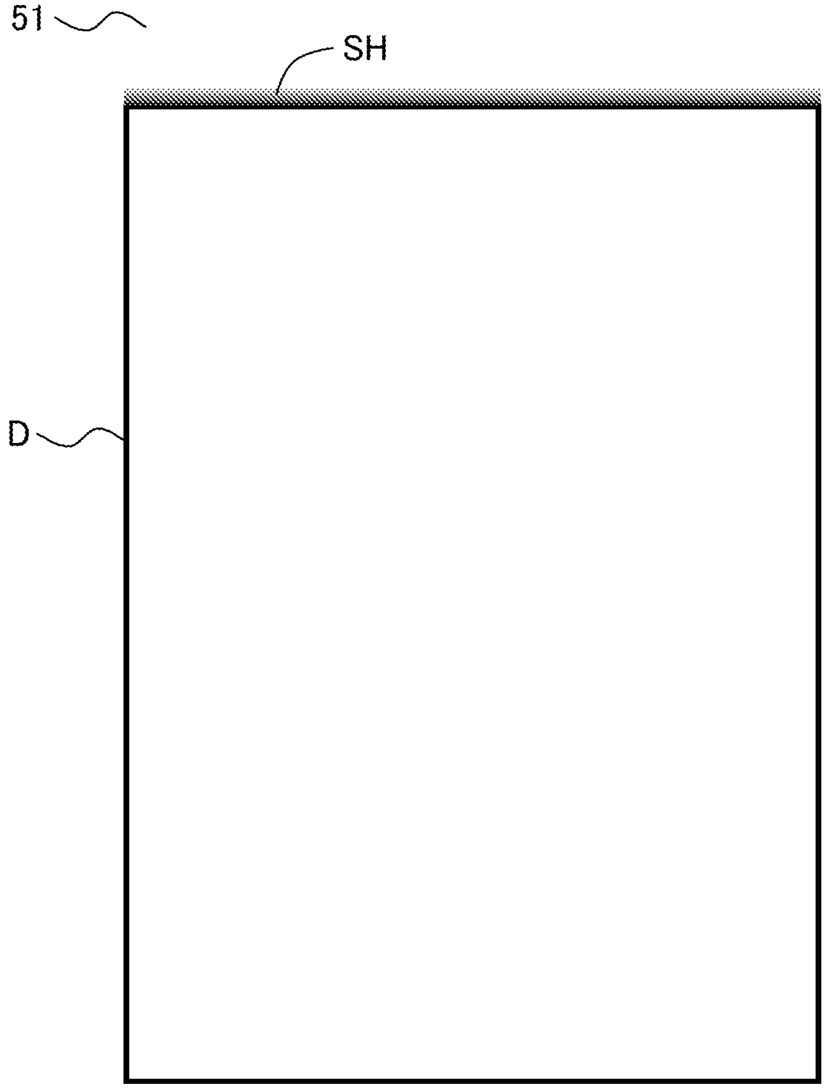
FIG. 3 is a schematic diagram illustrating a document that has been read by the automatic document reading apparatus of the embodiment.

By the conveyance member 14, the document D is passed through the conveyance path with this predetermined interval at a predetermined constant speed. At this time, when the document has been read from a leading edge to a trailing edge by the reading unit 20 for the front surface, the image as illustrated in FIG. 3 is obtained. A shadow SH projected onto a background member (white color sheet 51) is formed at the leading edge of the document in the read image, and an outline of that shadow SH exhibits, more or less, gradation from black to white. The control unit 3 recognizes this boundary, and, by supposing it as a line of the leading edge of the document, performs digital skew correction by adjusting rotation. To be noted, while, in the present embodiment, the control of the skew correction is performed by the control unit 3 disposed in the image forming apparatus 1, it is not limited to this, and by including a control unit in the automatic document reading apparatus 10 or an external apparatus, it is acceptable to allow this control unit to perform the control. That is, the control unit 3 can perform the skew control based on the image of the document D read by the CCD 23, and the control unit 3 may be installed in any location.

Here, so as to detect the shadow SH, a predetermined interval within the gradation of the shadow SH is determined, and a change in brightness within that interval is calculated. When a numerical value of this change in the brightness exceeds a predetermined threshold value, it becomes possible to detect that there is the boundary of the shadow SH. While, by lowering this threshold value, it is possible to detect the boundary of the shadow SH that is not sharp, since, for example, when signal-to-noise (S/N noise) is generated in the image, there is a high likelihood of the erroneous detection of the shadow SH where the shadow SH is not originally present, it is desirable to set the threshold value as high as possible. Therefore, a sharp transition from black to white in the gradation of the boundary is preferable, and the present embodiment intends to achieve this.

Here, as illustrated in FIGS. 1 and 2, the reading unit 20 is arranged below the reading glass 21, that is, on an opposite side of the platen guide 50 across the reading glass 21. The illumination unit 40 is a light source according to the present embodiment, which emits light toward the document D and the platen guide 50. The first illumination portion 41 of the illumination unit 40 emits the light toward the document D from an upstream side in the conveyance direction DF, and the second illumination portion 42 emits the light from a downstream side in the conveyance direction DF. That is, when viewed in a width direction perpendicular to the conveyance direction DF of the document D, an irradiating direction of the light (a direction of an optical axis) emitted by the first illumination portion 41 is set to be inclined to the downstream side in the conveyance direction DF from a side of the reading unit 20 (reading unit side) toward a side of the platen guide 50 (background member side). That is, the irradiating direction of the light of the first illumination portion 41 is a direction that inclines downstream in the conveyance direction DF toward a downstream side in the irradiating direction. The light emitted from the first and second illumination portions 41 and 42 reaches an intermediate plane 43 positioned in the middle of the first and second illumination portions 41 and 42 in the conveyance direction DF, and, using the intermediate plane 43 as a reading position, light reflected by the white color sheet 51 or the document D is read by the reading unit 20.

In the present embodiment, the white color sheet 51 is affixed to the reading position (position that overlaps the intermediate plane) which becomes the background member arranged on the platen guide 50 in a manner facing the reading glass 21. When mass-producing the platen guide 50, it is desirable to avoid a risk that, when reading a surface of the platen guide 50, whiteness may become uneven due to molding defects such as shrinkage. Therefore, in the present embodiment, a sheet material with stability in productivity is affixed to the platen guide 50 as the white color sheet 51, and applied as the background member. However, it is not limited to the usage of the white color sheet 51 that is the sheet material, and it is acceptable to apply a surface of the platen guide 50 as the background member. Further, it is not limited to a white color, and other light colors are also acceptable.

The image that is read by the reading unit 20 is formed by scattered light produced when the light emitted from the illumination unit 40 hits an object on the intermediate plane 43. In particular, at a step where the document D has not reached the reading position (intermediate plane 43), the scattered light in a position 51*a* on the white color sheet 51 forms the read image. Here, in the present embodiment, the white color sheet 51 that becomes the background member at this reading time is inclined from a horizontal angle to an angle θ1 such that the white color sheet 51 directly faces the first illumination portion 41. That is, the white color sheet 51 is arranged such that the angle θ1 becomes positive. In other words, the white color sheet 51 has a planar shape inclined such that the downstream side in the conveyance direction DF is closer to the reading glass 21 than the upstream side. That is, the white color sheet 51 is a flat surface inclined at an angle of θ1 with respect to an upper surface of the reading glass 21. To be noted, in the present embodiment, the planar shape refers to not only objects with smooth surfaces, but also includes objects with minute embossing or debossing (such as undulations on a scale of tens of micrometers (μm)).

Figure 4A:
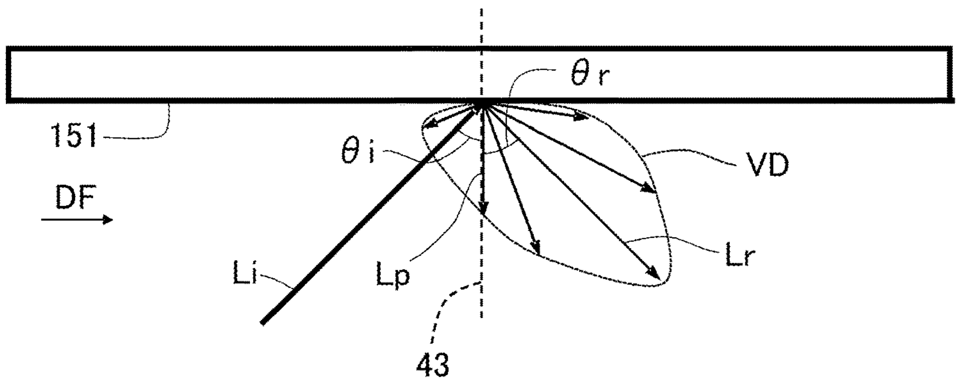
FIG. 4A is a diagram illustrating a state in which light incident from an upstream side is reflected on a horizontal surface.
Figure 4B:
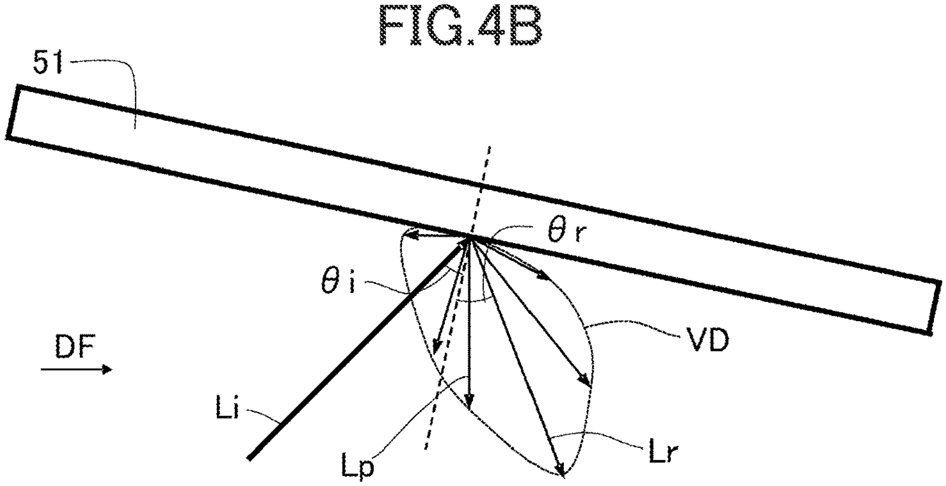
FIG. 4B is a diagram illustrating a state in which the light incident from the upstream side is reflected on an inclined surface.
Figure 4C:
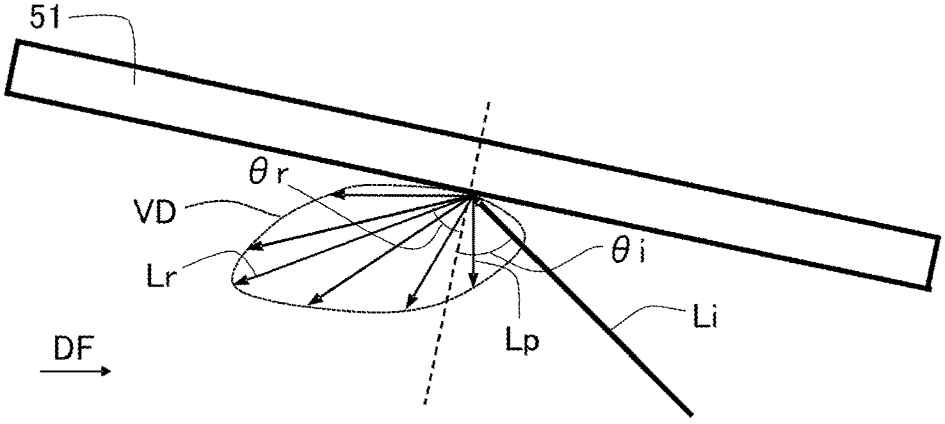
FIG. 4C is a diagram illustrating a state in which light incident from a downstream side is reflected on the inclined surface.

Li in FIGS. 4A, 4B, and 4C indicates an optical axis of the light emitted from the first illumination portion 41. Generally, when the light hits an object (for example, a horizontal sheet 151), a distribution of the reflected light becomes a distribution as illustrated in FIG. 4A. Specular reflection component light Lr, whose reflection angle is θr that is the same as an incident angle θi of the incident light Li, becomes strongest in intensity as the reflected light, and the intensity of the scattered light weakens as an angle deviates from the specular reflection component light Lr, which substantially acts as a center. A vector distribution VD of the intensity and a direction of that scattered light forms a distribution in which endpoints of the reflected light vectors are arranged substantially on an ellipse. While the scattered light is distributed as described above, in the present embodiment, among the light emitted to the position 51*a* in FIG. 2, only a scattered light component Lp, which is a component directed vertically downward, is input to the reading unit 20, and the brightness as the image is obtained.

Next, a state of the image when the leading edge of the document enters the reading position (intermediate plane 43), that is, the shadow SH of the leading edge of the document used for the digital skew correction will be described. Progression from a state illustrated in FIG. 2 until a state in which the leading edge of the document reaches the reading position (intermediate plane 43) by being moved to a right side (downstream side) is sequentially illustrated from states A to F in FIGS. 5A through 7B.

Figure 5A:
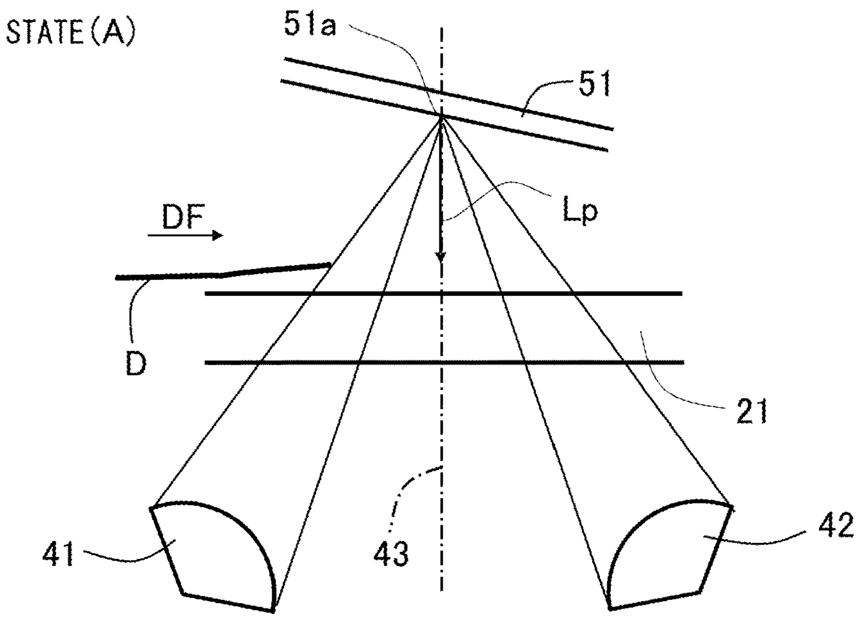
FIG. 5A is a cross-sectional view illustrating a state A in which light is incident with respect to the document that is conveyed.
Figure 5B:
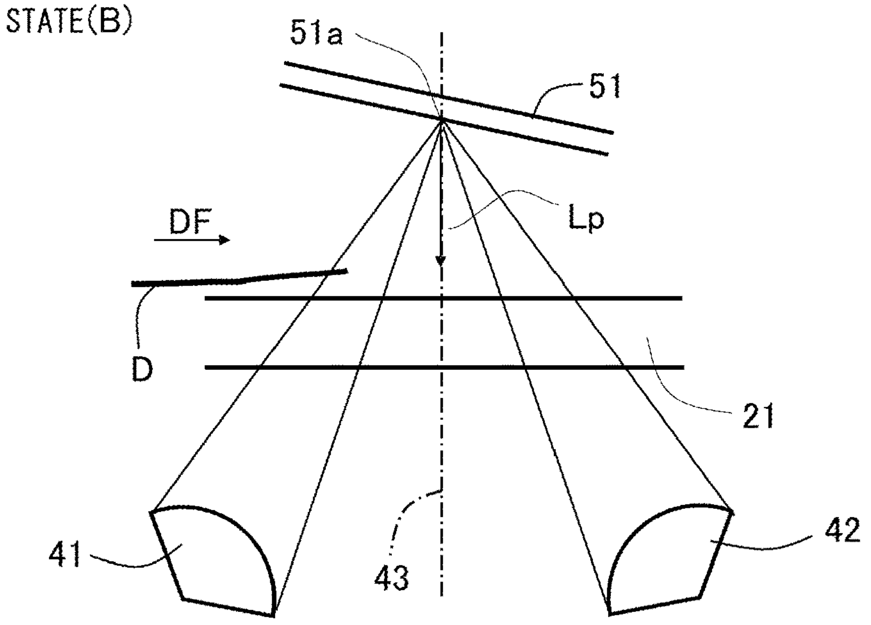
FIG. 5B is a cross-sectional view illustrating a state B in which the light is incident with respect to the document that is conveyed.
Figure 6A:
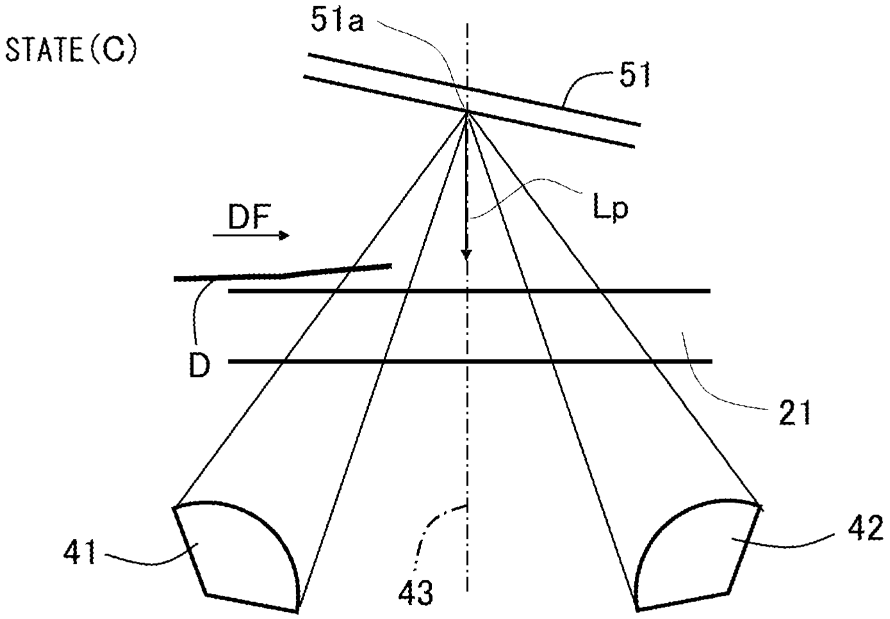
FIG. 6A is a cross-sectional view illustrating a state C in which the light is incident with respect to the document that is conveyed.
Figure 6B:
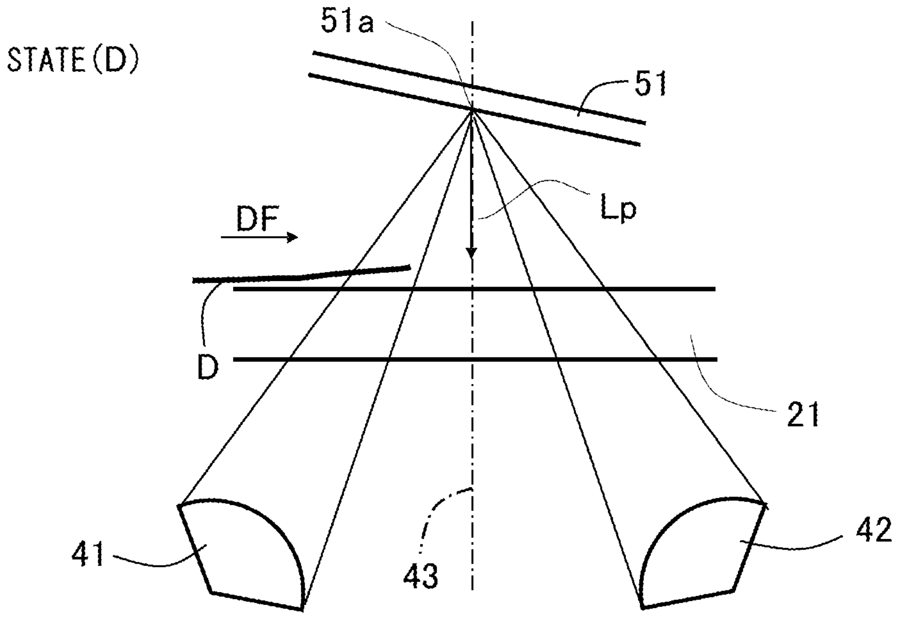
FIG. 6B is a cross-sectional view illustrating a state D in which the light is incident with respect to the document that is conveyed.

The state A illustrated in FIG. 5A corresponds to a moment at which the document D approaches the reading position (intermediate plane 43) and enters a boundary of illumination rays emitted from the first illumination portion 41 to the position 51A. At this time, the scattered light Lp of the vertically downward component read by the reading unit 20 has not yet been affected by the shadow SH, and the reading unit 20 receives all the reflected light from the position 51A on the white color sheet 51, and the image appears completely white.

When transitioning to the states B, C, and D, the brightness provided by the first illumination portion 41 gradually diminishes. For example, in the state C illustrated in FIG. 6A, approximately half of the light emitted from the first illumination portion 41 is blocked, and a brightness value becomes approximately half of an initial brightness value of the first illumination portion 41. That is, input brightness to the reading unit 20 has decreased from initial input brightness, and this is the shadow SH that is to be detected.

Figure 7A:
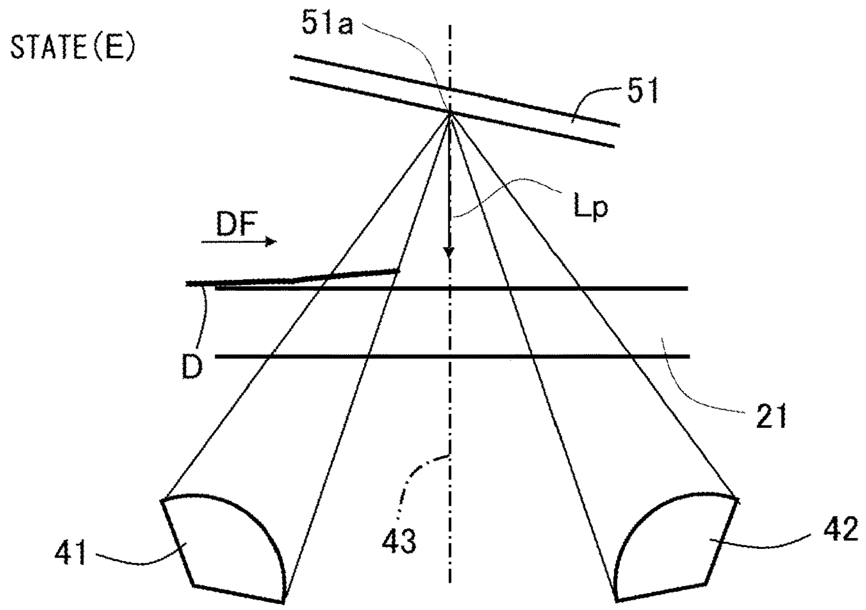
FIG. 7A is a cross-sectional view illustrating a state E in which the light is incident with respect to the document that is conveyed.
Figure 7B:
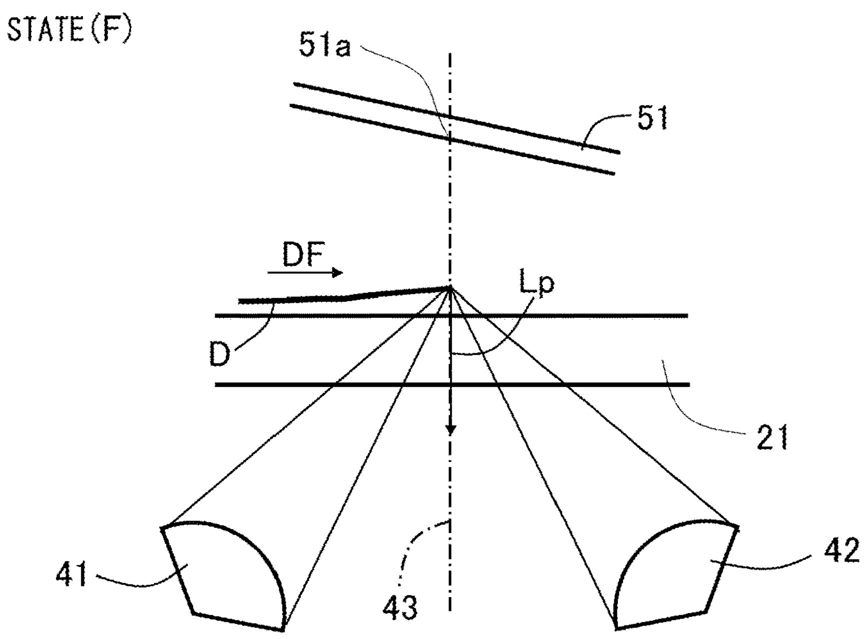
FIG. 7B is a cross-sectional view illustrating a state F in which the light is incident with respect to the document that is conveyed.

Further, when transitioned to the state E illustrated in FIG. 7A, all the light emitted from the first illumination portion 41 to the position 51A is blocked, and the input brightness by the first illumination portion 41 becomes 0. When finally transitioned to the state F, the leading edge of the document reaches the intermediate plane 43, and thereafter the light vertically scattered on the document surface is input to the reading unit 20.

Figure 8A:
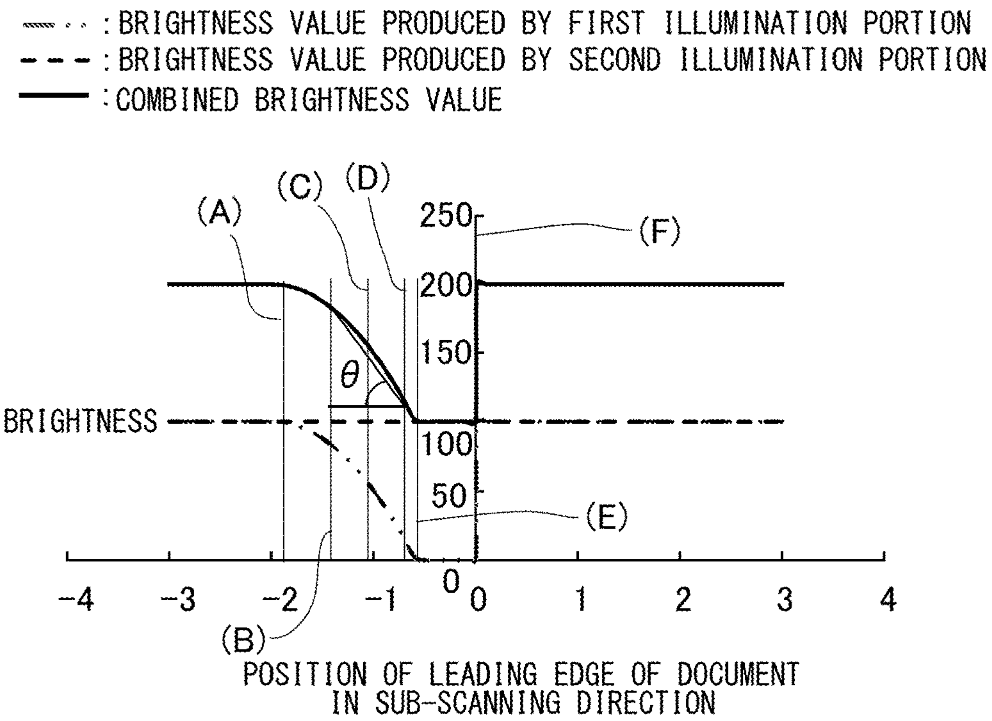
FIG. 8A is a graph illustrating a combined received light amount of light incident from the upstream and downstream sides in a case where a background member is the horizontal surface.
Figure 8B:
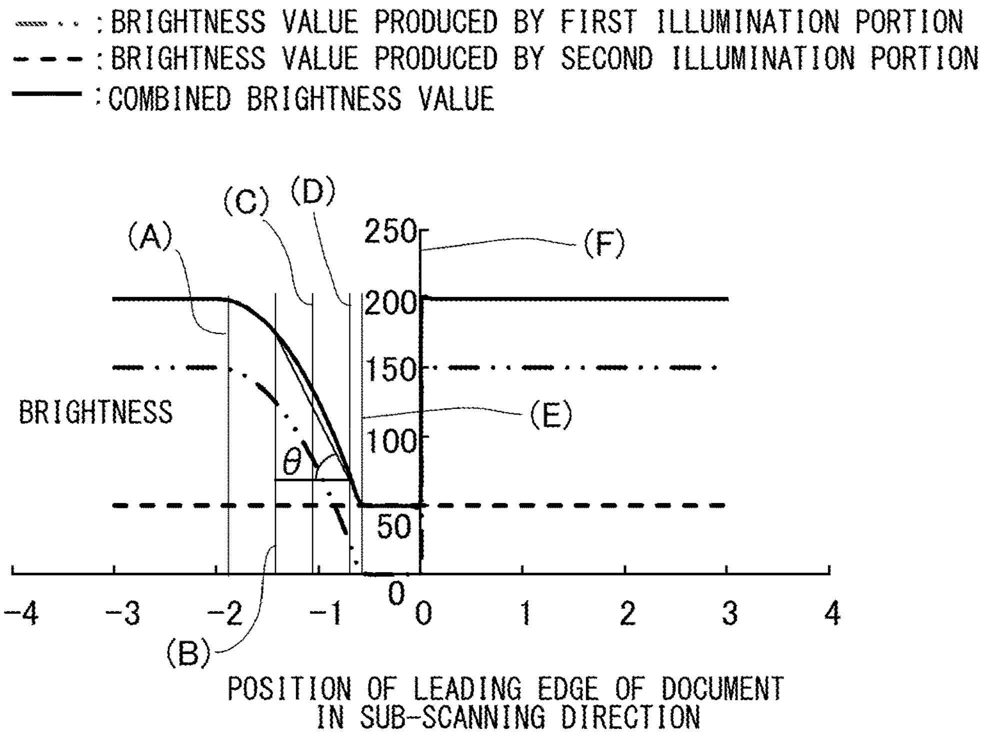
FIG. 8B is a graph illustrating a combined received light amount of the light incident from the upstream and downstream sides in a case where the background member is the inclined surface.

FIG. 8A illustrates a state of the brightness input as the read image at this time when a background member is the horizontal sheet 151 (refer to FIG. 4A), and FIG. 8B illustrates a state when the background member is the inclined surface (the white color sheet 51 of the present embodiment) inclined toward the first illumination portion 41. Horizontal axes of FIGS. 8A and 8B are a position of the leading edge of the document in the sub-scanning direction, and, by setting the position of the leading edge of the document to zero when the leading edge of the document is at the reading position, the position of the leading edge of the document is marked as positive when the position being downstream from the reading position, and marked as negative when the positive being upstream. Lines on the graphs indicate three types of the brightness values: the brightness value produced only by the first illumination portion 41, the brightness value produced only by the second illumination portion 42, and the brightness value when both are combined. Further, positions in vertical axes of FIGS. 8A and 8B correspond to the states A to F in FIGS. 5A to 7B.

Sections in which the shadow is detected are set by B to D, and it is possible to detect as the shadow when a change in the brightness of a combined amount of the light received at that time is equal to more than a certain value. That is, as an angle θ illustrated in FIGS. 8A and 8B increases, a boundary between a background and the shadow becomes clearer, and shadow detection performance improves.

Since, in the present embodiment, θ is larger in comparison with a case of the horizontal surface, the detection performance is satisfactory.

Next, using FIGS. 4A and 4B, a mechanism by which the change in the brightness increases by the inclination of the background member will be described. While FIG. 4A is a diagram illustrating the distribution of the scattered light on the horizontal sheet 151, among the scattered light, only vertically downward scattered light Lp is directed toward the reading unit 20.

On the other hand, FIG. 4B illustrates the distribution of the scattered light on the inclined surface (the white color sheet 51). While, as with FIG. 4A, among the incident light from the upstream side, only Lp is directed to the reading unit 20, the vector length of Lp of the present embodiment is longer, and larger amount of the light enters in comparison with the case of the horizontal sheet 151. To be noted, while FIG. 4C illustrates the scattered light, incident from the downstream side, emitted by the second illumination portion 42, to the same inclined surface (white color sheet 51), contrary to FIG. 4B, the vector length of Lp is shorter in comparison with the case of the horizontal sheet 151, and less amount of the light enters the reading unit 20.

That is, in a case where the first and second illumination portions 41 and 42 have equivalent illumination intensity, as illustrated in FIG. 8A, maximum brightness values produced by the first and second illumination portions 41 and 42 on the horizontal sheet 151 are the same (here, they are set to 100 each). On the other hand, by applying the inclined surface (white color sheet 51) as in the present embodiment, it is read in the same way as a case where a light amount from the first illumination portion 41 increases, while a light amount from the second illumination portion 42 decreases (here, the maximum brightness values produced by the first and second illumination portions 41 and 42 are respectively set to 150 and 50). Then, the combined brightness value produced by the first and second illumination portions 41 and 42, that is, the brightness value that is read is indicated by solid lines in FIGS. 8A and 8B, and θ becomes larger in a case of the inclined surface (white color sheet 51) of the present embodiment. Therefore, it is possible to clarify the boundary between the background and the shadow, and possible to improve the shadow detection performance.

In the present embodiment, the white color sheet 51 is disposed in an inclined manner, while maintaining a perfectly flat surface around the edges. This is because, due to considerable variability in the reading position, if an inclination angle is not maintained as a plane, differences in individual apparatus bodies and usage conditions cause θ to vary, and it becomes difficult to stably detect the shadow satisfactorily. Further, the inclination angle at which satisfactory detection accuracy can be obtained in the present embodiment is in a range of 8 degrees to 20 degrees, and, in particular, it is most satisfactory at an angle of 12 degrees. That is, when viewed in the width direction of the document D, the white color sheet 51 is preferably inclined at an angle in a range of equal to or more than 98 degrees and equal to or less than 110 degrees with respect to the direction perpendicular to the conveyance direction DF and the width direction, and an angle of 102 degrees is optimal.

As described above, according to the automatic document reading apparatus 10 of the present embodiment, the white color sheet 51 of the platen guide 50 has the planar shape inclined such that, in the conveyance direction DF, the downstream side is brought closer to the reading glass 21 than the upstream side. Further, the first illumination portion 41 emits the light in a direction which inclines toward the downstream side in the conveyance direction DF from the reading unit 20 toward the white color sheet 51. Thereby, since the leading edge of the document sufficiently forms the shadow, it is possible to accurately recognize the position of the shadow SH, and possible to improve the accuracy of the skew correction.

That is, when the light is emitted to the leading edge of document, illumination on the upstream side has a function of forming the shadow by projecting the shadow at the reading position on the background member. On the other hand, since illumination on the downstream side does not project the shadow at the reading position on the background member, the illumination from the downstream side has only a function of obliterating the shadow. As with the present embodiment, by inclining the platen guide 50 in a direction that faces the first illumination portion 41, it is possible to enhance an illumination effect of the first illumination portion 41 on the read image, while weakening the effect of the second illumination portion 42 on the read image. Thereby, it is possible to increase the shadow detection accuracy by enhancing the contrast of the shadow of the leading edge of the document. Further, by forming the background member in the planar shape, since, even when the reading position mechanically varies, it is possible to maintain a constant angle of the background member that has a strong sensitivity to how the shadow is formed, it is possible to obtain a stable shadow contrast.

Figure 9:
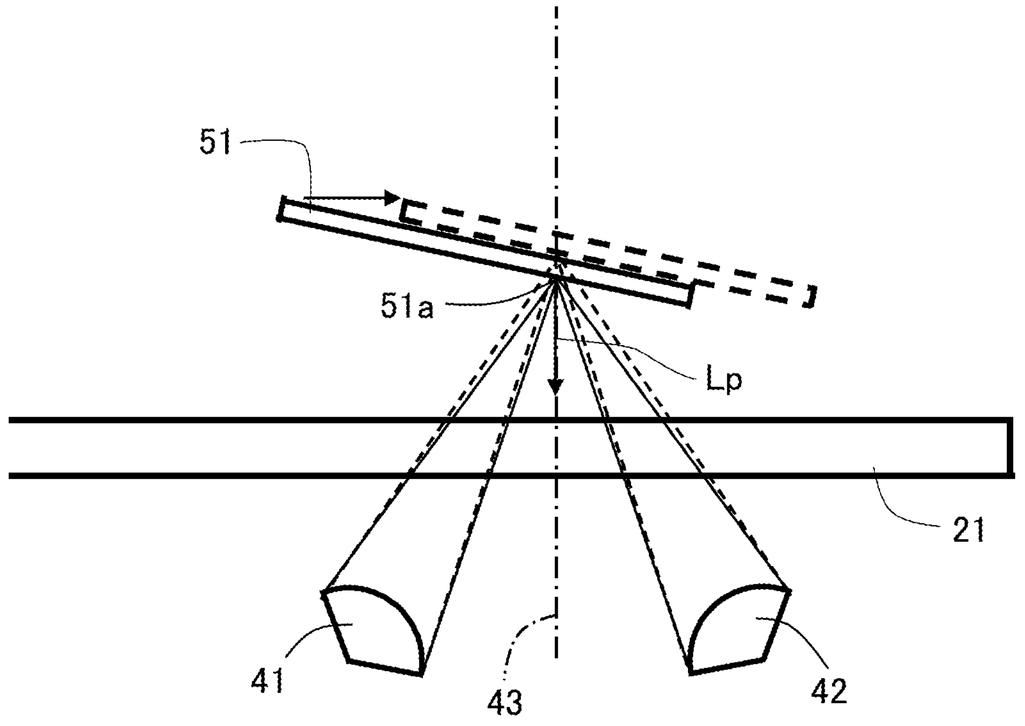
FIG. 9 is a cross-sectional view illustrating a vertical fluctuation of the background member in a case where a platen glass has moved in a conveyance direction.

To be noted, in the present embodiment described above, as illustrated in FIG. 2, the platen guide 50 possesses a degree of freedom in a vertical direction so as to abut against the reading glass 21 via the abutting member. That is, the platen guide 50 is movable in a direction (in the present embodiment, the vertical direction) intersecting with the conveyance direction DF and the width direction. Therefore, so as not to interfere that vertical movement, slight play is provided in the conveyance direction DF with respect to the frame 11*a* of the ADF 11. However, if there is play in the conveyance direction DF, as illustrated in FIG. 9, when the inclined white color sheet 51 moves in the conveyance direction FD, an intersecting position with the intermediate plane 43 moves vertically, while causing the position 51*a* to move vertically. Since the vertical movement of the position 51*a* affects the brightness change in the shadow, it is not preferred for improving the detection accuracy.

Figure 10:
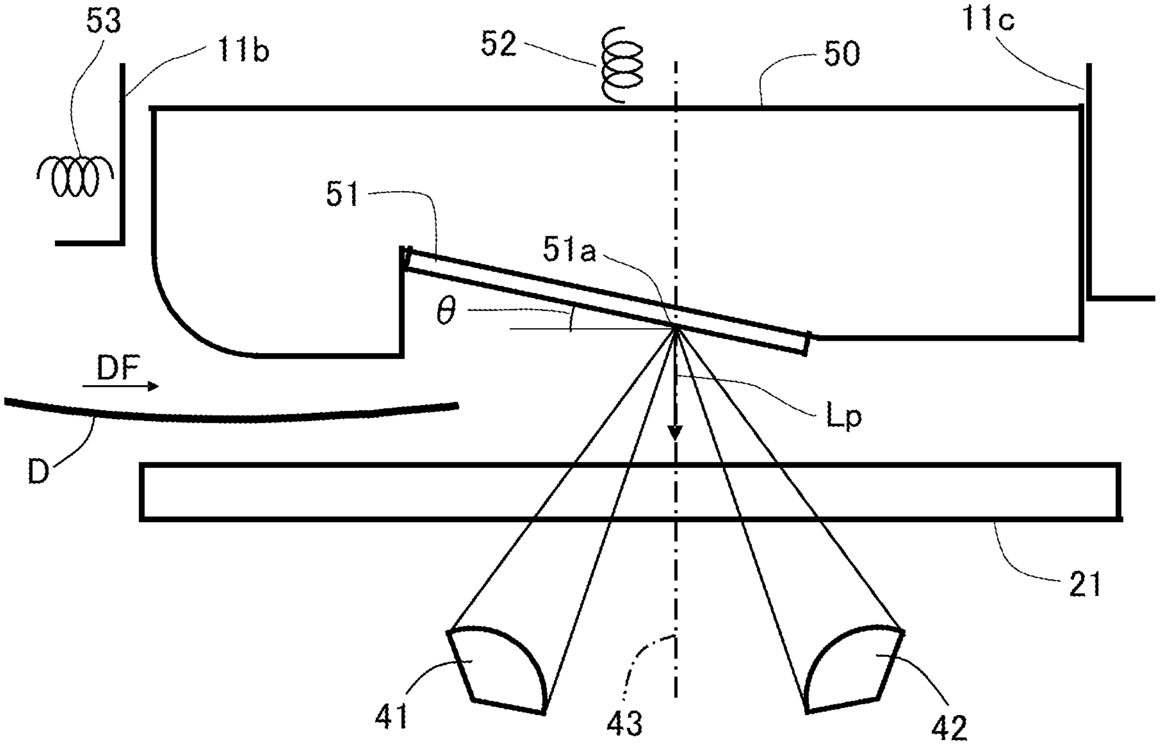
FIG. 10 is a cross-sectional view illustrating a major part of an automatic document reading apparatus pertinent to a variant example of the embodiment.

Therefore, as illustrated in FIG. 10, it is acceptable to configure such that, by arranging a spring member 53 in a manner capable of pressing a pressing portion 11*b* to press the platen guide 50 from the upstream side to the downstream side in the conveyance direction DF, it is possible to press the platen guide 50 onto a regulation wall 11*c*. That is, the spring member 53 is a first urging member according to the present embodiment, which, by urging the platen guide 50 one of upstream and downstream in the conveyance direction DF (here, downstream), abuts the platen guide 50 against the regulation wall 11*c* connected to the frame 11*a*. The regulation wall 11*c* is an example of a guide member according to the present embodiment, which guides a movement of the platen guide 50*a*. Thereby, by removing the play of the platen guide 50 in the conveyance direction DF, it is possible to obtain more stable detection accuracy. Further, since, here, the platen guide 50 abuts against the regulation wall 11*c* on the downstream side, when the document D comes into contact with and presses the platen guide 50 to the downstream side, the platen guide 50 does not move regardless of an urging force of the spring member 53.

To be noted, while, in an example illustrated in FIG. 10, a configuration in which the platen guide 50 is pressed by the spring member 53 to the regulation wall 11*c* on the downstream side is described, it is not limited to this. For example, it is acceptable to configure such that a spring member presses the platen guide 50 from the downstream side to the upstream side so as to abut the platen guide 50 against a regulation wall on the upstream side. In this case, when the document D comes into contact with and presses the platen guide 50 to the downstream side, if the spring member has an urging force that is larger than a pressing force, it is possible to suppress the movement of the platen guide 50 in the conveyance direction DF.

To be noted, while, in an example illustrated in FIG. 10, a configuration in which the platen guide 50 is pressed by the spring member 53 to the regulation wall 11*c* on the downstream side is described, it is not limited to this. For example, it is acceptable to configure such that a spring member presses the platen guide 50 from the downstream side to the upstream side so as to abut the platen guide 50 against a regulation wall on the upstream side. In this case, when the document D comes into contact with and presses the platen guide 50 to the downstream side, if the spring member has an urging force that is larger than a pressing force, it is possible to suppress the movement of the platen guide 50 in the conveyance direction FD.

According to this disclosure, it is possible to improve the accuracy of the skew correction.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-016050, filed Feb. 6, 2023 which is hereby incorporated by reference herein in its entirety.

What is claimed is:

1. An image reading apparatus comprising:

a conveyance member configured to convey a sheet;

a transparent member;

a background member disposed opposite the transparent member; and a reading unit disposed on a side of the transparent member opposite the background member, the reading unit including a light source and a reading sensor, wherein the light source includes a first illumination portion and a second illumination portion, and is configured to emit light toward a sheet, and the reading sensor is configured to read, through the transparent member, a shadow of the sheet projected onto the background member and an image of the sheet, wherein, as viewed in a width direction perpendicular to a conveyance direction of a sheet, an irradiating direction of first light emitted from the first illumination portion is inclined toward a downstream side in the conveyance direction, an irradiating direction of second light emitted from the second illumination portion is inclined toward an upstream side in the conveyance direction, wherein the background member has a planar shape inclined such that, in the conveyance direction, a downstream side of the background member is closer to the transparent member than an upstream side of the background member, wherein, as viewed in the width direction, a first angle formed between the irradiating direction of the first light and a normal direction of the planar shape is smaller than a second angle formed between the irradiating direction of the second light and the normal direction, and wherein the reading sensor is configured to read the first light and the second light reflected from the background member and passing through a predetermined region of the transparent member, the predetermined region being positioned between the first illumination portion and the second illumination portion in the conveyance direction when viewed in the width direction.

2. The image reading apparatus according to claim 1, wherein in a state where the background member faces the transparent member, the background member is movable in a direction perpendicular to both the conveyance direction and the width direction, the image reading apparatus further comprising a first urging member configured to urge the background member in the conveyance direction, against a guide member that guides the background member.

3. The image reading apparatus according to claim 2, wherein the first urging member is configured to urge the background member toward the downstream side of the conveyance direction.

4. The image reading apparatus according to claim 1, wherein in a state where the background member faces the transparent member, the background member is movable in a direction perpendicular to both the conveyance direction and the width direction, the image reading apparatus further comprising a second urging member configured to urge the background member against the transparent member.

5. The image reading apparatus according to claim 1, wherein, when viewed in the width direction, an angle of the background member with respect to a direction perpendicular to the conveyance direction and the width direction is equal to or more than 98 degrees and equal to or less than 110 degrees.

6. The image reading apparatus according to claim 1, wherein, when viewed in the width direction, an angle of the background member with respect to a surface of the transparent member that faces the background member is equal to or more than 8 degrees and equal to or less than 20 degrees.

7. The image reading apparatus according to claim 1, further comprising:

a facing member configured to face the transparent member, the facing member being configured to form a conveyance path of a sheet with the transparent member, wherein the background member is formed on the facing member.

8. The image reading apparatus according to claim 7, wherein the background member includes a sheet material that is attached to the facing member.

9. The image reading apparatus according to claim 1, wherein a color of the background member has a white color.

10. The image reading apparatus according to claim 1, further comprising:

a control unit configured to correct a skew of the image of the sheet having been read by the reading unit based on the shadow of the sheet detected by the reading unit.

11. The image reading apparatus according to claim 1, wherein in a case where the first illumination portion and the second illumination portion have equivalent illumination intensity, and in a state in which the first illumination portion and the second illumination portion emit light toward the background member so that light emitted from each of the first illumination portion and the second illumination portion is reflected by the background member and is incident on the reading unit, the amount of light that is emitted from the second illumination portion, reflected by the background member, and incident on the reading unit is smaller than the amount of light that is emitted from the first illumination portion, reflected by the background member, and incident on the reading unit.

12. An image forming apparatus comprising:

a conveyance member configured to convey a sheet;

a transparent member;

a background member disposed opposite the transparent member;

a reading unit disposed on a side of the transparent member opposite the background member, the reading unit including a light source and a reading sensor; and an image forming unit configured to form an image on a sheet based on image information read by the reading unit, wherein the light source includes a first illumination portion and a second illumination portion, and is configured to emit light toward a sheet, and the reading sensor is configured to read, through the transparent member, a shadow of the sheet projected onto the background member and an image of the sheet, wherein, as viewed in a width direction perpendicular to a conveyance direction of a sheet, an irradiating direction of first light emitted from the first illumination portion is inclined toward a downstream side in the conveyance direction, an irradiating direction of second light emitted from the second illumination portion is inclined toward an upstream side in the conveyance direction, wherein the background member has a planar shape inclined such that, in the conveyance direction, a downstream side of the background member is closer to the transparent member than an upstream side of the background member, wherein, as viewed in the width direction, a first angle formed between the irradiating direction of the first light and a normal direction of the planar shape is smaller than a second angle formed between the irradiating direction of the second light and the normal direction, and wherein the reading sensor is configured to read the first light and the second light reflected from the background member and passing through a predetermined region of the transparent member, the predetermined region being positioned between the first illumination portion and the second illumination portion in the conveyance direction when viewed in the width direction.

13. The image forming apparatus according to claim 12, wherein in a state where the background member faces the transparent member, the background member is movable in a direction perpendicular to both the conveyance direction and the width direction, the image forming apparatus further comprising a first urging member configured to urge the background member in the conveyance direction, against a guide member that guides the background member.

14. The image forming apparatus according to claim 13, wherein the first urging member is configured to urge the background member toward the downstream side of the conveyance direction.

15. The image forming apparatus according to claim 12, wherein in a state where the background member faces the transparent member, the background member is movable in a direction perpendicular to both the conveyance direction and the width direction, the image forming apparatus further comprising a second urging member configured to urge the background member against the transparent member.

16. The image forming apparatus according to claim 12, wherein, when viewed in the width direction, an angle of the background member with respect to a direction perpendicular to the conveyance direction and the width direction is equal to or more than 98 degrees and equal to or less than 110 degrees.

17. The image forming apparatus according to claim 12, wherein, when viewed in the width direction, an angle of the background member with respect to a surface of the transparent member that faces the background member is equal to or more than 8 degrees and equal to or less than 20 degrees.

18. The image forming apparatus according to claim 12, further comprising:

a facing member configured to face the transparent member, the facing member being configured to form a conveyance path of a sheet with the transparent member, wherein the background member is formed on the facing member.

19. The image forming apparatus according to claim 18, wherein the background member includes a sheet material that is attached to the facing member.

20. The image forming apparatus according to claim 12, wherein a color of the background member has a white color.

21. The image forming apparatus according to claim 12, further comprising:

a control unit configured to correct a skew of the image of the sheet having been read by the reading unit based on the shadow of the sheet detected by the reading unit.

* * * * *